(12) United States Patent
Kagoshima et al.

(10) Patent No.: US 10,325,033 B2
(45) Date of Patent: Jun. 18, 2019

(54) DETERMINATION OF CONTENT SCORE

(71) Applicant: Searchmetrics GmbH, Berlin (DE)

(72) Inventors: Alexander Kagoshima, Berlin (DE);
Kai Londenberg, Hannover (DE);
Fang Xu, Berlin (DE)

(73) Assignee: SEARCHMETRICS GMBH, Berlin (DE)

( * ) Notice: Subject to any disclaimer, the term of this patent is extended or adjusted under 35 U.S.C. 154(b) by 0 days.

(21) Appl. No.: 15/337,268

(22) Filed: Oct. 28, 2016

(65) Prior Publication Data

US 2018/0121430 A1    May 3, 2018

(51) Int. Cl.
*G06F 17/30* (2006.01)

(52) U.S. Cl.
CPC ............... *G06F 17/30864* (2013.01)

(58) Field of Classification Search
CPC .............. G06F 17/3053; G06F 17/30864
USPC .......................................... 707/706
See application file for complete search history.

(56) References Cited

U.S. PATENT DOCUMENTS

| | | | |
|---|---|---|---|
| 8,396,864 B1 * | 3/2013 | Harinarayan | G06F 17/30707 707/722 |
| 8,805,840 B1 * | 8/2014 | Joshi | G06F 17/30707 707/737 |
| 8,874,558 B1 * | 10/2014 | He | G06F 17/30864 707/706 |
| 8,892,549 B1 | 11/2014 | Thakur | |
| 9,201,927 B1 * | 12/2015 | Zhang | G06F 17/271 |
| 9,213,748 B1 | 12/2015 | Matias et al. | |
| 2003/0018659 A1 * | 1/2003 | Fuks | G06F 17/30646 715/230 |
| 2003/0036942 A1 | 2/2003 | Wescott | |
| 2005/0065916 A1 * | 3/2005 | Ge | G06F 17/3087 |
| 2005/0071328 A1 | 3/2005 | Lawrence | |
| 2007/0043761 A1 * | 2/2007 | Chim | G06F 17/30643 |
| 2007/0233656 A1 | 10/2007 | Bunescu et al. | |
| 2009/0083251 A1 | 3/2009 | Sahasrabudhe et al. | |
| 2009/0106235 A1 | 4/2009 | Tankovich et al. | |
| 2009/0234727 A1 | 9/2009 | Petty | |
| 2009/0292677 A1 | 11/2009 | Kim | |
| 2009/0292685 A1 | 11/2009 | Liu et al. | |
| 2010/0030770 A1 | 2/2010 | Cao et al. | |
| 2011/0029513 A1 * | 2/2011 | Morris | G06F 17/30864 707/728 |
| 2011/0106895 A1 | 5/2011 | Ventilla et al. | |
| 2012/0047120 A1 * | 2/2012 | Connolly | G06F 17/30864 707/706 |

(Continued)

OTHER PUBLICATIONS

Dover, "The Evil Side of Google? Exploring Google's User Data Collection," Jun. 24, 2008.

(Continued)

*Primary Examiner* — Kimberly L Wilson
(74) *Attorney, Agent, or Firm* — The Dobrusin Law Firm, P.C.

(57) ABSTRACT

A computer-implemented method of determining a content score of resource content comprises receiving one or more main topics highly relevant to the resource content; receiving the resource content; determining, using the one or more main topics, a content score value indicating the content score; and outputting the determined content score value, a corresponding system, computing device and non-transitory computer-readable storage medium.

14 Claims, 9 Drawing Sheets

(56) References Cited

U.S. PATENT DOCUMENTS

| | | | |
|---|---|---|---|
| 2012/0131015 A1* | 5/2012 | Al Badrashiny | G06F 17/273 707/748 |
| 2012/0166414 A1* | 6/2012 | Decker | G06F 17/30705 707/709 |
| 2013/0325779 A1* | 12/2013 | Shahshahani | G06N 5/02 706/46 |
| 2014/0108103 A1* | 4/2014 | Romaine | G06Q 10/06395 705/7.41 |
| 2014/0108369 A1 | 4/2014 | Nijjer | |
| 2014/0164345 A1 | 6/2014 | Connolly et al. | |
| 2014/0164362 A1 | 6/2014 | Syed et al. | |
| 2014/0222819 A1 | 8/2014 | Dies | |
| 2014/0229810 A1 | 8/2014 | Ramanathan et al. | |
| 2014/0344261 A1 | 11/2014 | Navta et al. | |
| 2015/0039983 A1* | 2/2015 | Gibb | G06F 17/30905 715/206 |
| 2015/0058712 A1 | 2/2015 | Berk et al. | |
| 2015/0134654 A1 | 5/2015 | Fuzell-Casey | |
| 2015/0186526 A1 | 7/2015 | Rao et al. | |
| 2015/0293999 A1 | 10/2015 | Zhan | |
| 2016/0041985 A1 | 2/2016 | Manterach et al. | |
| 2016/0070748 A1 | 3/2016 | Firat et al. | |
| 2016/0124944 A1* | 5/2016 | Andreoli | G06F 17/2854 704/2 |
| 2016/0125087 A1 | 5/2016 | Mallah et al. | |
| 2017/0085509 A1* | 3/2017 | Fernandez | H04L 51/12 |

OTHER PUBLICATIONS

Co-Pending U.S. Appl. No. 15/284,739, filed Oct. 4, 2016.
Co-Pending U.S. Appl. No. 15/822,738, filed Nov. 27, 2017.
Moody, Chris. "A Word is Worth a Thousand Vectors." Stitch Fix Technology—Multithreaded. Mar. 11, 2015. Web. May 20, 2017. http://multithreaded.stitchfix.com/blog/2015/03/11/word-is-worth-a-thousand-vectors.
"Named-Entity Recognition." Wikiwand. Web. May 20, 2017. https://www.wikiwand.com/en/Named-entity_recognition.
Leskovec, Jure, et al. "3.5 Distance Measures." *Mining of Massive Datasets, Second Edition*, Cambridge University Press, 2014, p. 89.
Lin, Chin-Yew, et al. "3.4 Different Vector Similarity Measure Pruning Comparison." *Natural Language Understanding and Intelligent Applications*, Springer, 2016, p. 85.

* cited by examiner

DETERMINATION OF CONTENT SCORE

BACKGROUND OF THE INVENTION

Field of the Invention

The invention relates to a method, system, computing device and storage medium for determining a content score. More specifically, the invention relates to a method, system, computing device and storage medium for determining a content score of resource content in a network.

Background of the Invention

The World-Wide Web (www) comprises an indefinite number of webpages. Search engines crawl the webpages via the Internet and return, for user convenience, a list of webpages relevant to any particular search term, i.e. one or more keywords. Operators aiming to promote their webpages onto these lists of webpages create and optimize, using various techniques, their webpages for the search engines (search engine optimization, SEO).

Owing to the indefinite number of webpages and their ever changing contents, it is increasingly difficult to create and optimize webpages that match the users' search intention for a particular search query, and that are, thus, highly ranked by search engines in organic search results for relevant keywords. Recently, access to and usage of the World-Wide Web has moved from stationary personal computers to mobile computing devices, which adds another layer of complexity to search engine optimization.

The present invention overcomes present limitations and provides other advantages, as will become clearer to those skilled in the art from the present description.

BRIEF SUMMARY OF THE INVENTION

The present invention makes it easier to create and optimize webpages that are highly ranked by search engines by estimating their relevance to the user before publishing the webpage. In particular, the invention provides a method, system, computing device and storage medium for determining a content score which estimates the probability that content will be relevant and useful for a user searching for a given keyword.

According to an aspect of an embodiment, a computer-implemented method of determining a content score of resource content may comprise: with a processing module, executing on one or more computing devices, automatically: receiving one or more main topics highly relevant to the resource content; receiving the resource content; determining, using the one or more main topics, a content score value indicating the content score; and outputting the determined content score value.

According to an aspect of another embodiment, a method may further comprise: with the processing module, automatically: determining candidate content for addition to or deletion from the resource content; and outputting the candidate content.

According to an aspect of another embodiment, a method may further comprise: with the processing module, automatically: determining instructions, textual instructions or graphical instructions for improving the resource content; and outputting the instructions, textual instructions or graphical instructions.

According to an aspect of another embodiment, a method may further comprise: with the processing module, automatically: returning to receiving the resource content; determining whether the resource content has changed; and in case that the resource contents has changed, returning to determining the content score value.

According to an aspect of another embodiment, determining the content score value may comprise determining at least one of a relevance score value, a quality score value, a quantity score value, a language score value and an originality score value for the resource content; and calculating the content score value from at least one of the relevance score value, quality score value, quantity score value, language score value and originality score value.

According to an aspect of another embodiment, the content score value may be calculated by: summing at least two of the relevance score value, quality score value, quantity score value, language score value and originality score value; or averaging at least two of the relevance score value, quality score value, quantity score value, language score value and originality score value.

According to an aspect of another embodiment, calculating the content score value may comprise: calculating a weighted relevance score value by multiplying the relevance score value by a relevance weight value; calculating a weighted quality score value by multiplying the quality score value by a quality weight value; calculating a weighted quantity score value by multiplying the quantity score value by a quantity weight value; calculating a weighted language score value by multiplying the language score value by a language weight value; or calculating a weighted originality score value by multiplying the originality score value by a originality weight value; and the content score value may be calculated by: averaging at least two of the weighted relevance score value, weighted quality score value, weighted quantity score value, weighted language score value and weighted originality score value.

According to an aspect of another embodiment, calculating the content score value may comprise: determining whether the relevance score value is below a relevance threshold value; determining whether the quality score value is below a quality threshold value; determining whether quantity score value is below a quantity threshold value; determining whether the language score value is below a language threshold value; or determining whether the originality score value is below an originality threshold value; and in case that at least one of the relevance score value, quality score value, quantity score value, language score value and originality score value is below its threshold value, reducing the content score value to a predetermined value or by a predetermined amount.

According to an aspect of another embodiment, a method may further comprise: with the processing module, automatically: obtaining, from a plurality of resources, one or more relevant topics relevant to the resource content; wherein: the relevance score value is determined using the one or more relevant topics.

According to an aspect of another embodiment, a method may further comprise: with the processing module, automatically: converting the resource content into one or more content vectors; and converting the one or more main topics into one or more main-topic vectors; or converting the one or more relevant topics into a plurality of relevant-topic vectors; and determining, for the one or more main-topic vectors, one or more main-topic similarity values indicating similarity to the one or more content vectors; or determining, for the one or more relevant-topic vectors, one or more relevant-topic similarity values indicating similarity to the one or more content vectors; wherein: the relevance score value may be determined by: aggregating the one or more main-topic similarity values; or aggregating the one or more relevant-topic similarity values.

According to an aspect of another embodiment, obtaining the one or more relevant topics may comprise: obtaining the plurality of resources, the one or more main topics being highly relevant to each of the plurality of resources; and generating the one or more relevant topics from the plurality of resources, the one or more relevant topics being relevant to the plurality of resources.

According to an aspect of another embodiment, determining the content score value may comprise: obtaining a brief for the resource content, comprising: a plurality of essential-term target values for a plurality of essential terms; a plurality of relevant-term target values for a plurality of relevant terms; or a plurality of additional-term target values for a plurality of additional terms; and determining a plurality of essential-term count values by counting occurrence of each of the plurality of essential terms in the resource content; determining a plurality of relevant-term count values by counting occurrence of each of the plurality of relevant terms in the resource content; or determining a plurality of additional-term count values by counting occurrence of each of the plurality of additional terms in the resource content; and calculating an relevant-term ratio by dividing, for each of the plurality of essential terms, the relevant-term count value by the relevant-term target value; or calculating an essential-term ratio by dividing, for each of the plurality of essential terms, the essential-term count value by the essential-term target value; calculating an additional-term ratio by dividing, for each of the plurality of additional terms, the additional-term count value by the additional-term target value; and calculating a weighted essential-term value by multiplying the essential-term ratio by an essential-term weight value; calculating a weighted relevant-term value by multiplying the relevant-term ratio by a relevant-term weight value; or calculating a weighted additional-term value by multiplying the additional-term ratio by an additional-term weight value; and the relevance score value may be determined by: averaging at least two of the weighted essential-term value, weighted relevant-term value and weighted additional-term value; multiplying at least two of the weighted essential-term value, weighted relevant-term value and weighted additional-term value; or multiplying and subsequently potentizing at least two of the weighted essential-term value, weighted relevant-term value and weighted additional-term value.

According to an aspect of another embodiment, the relevance score value may be determined using at least one of: a textual element; a structural element, for example title element, heading element or table element; a media element, for example graphical element or video element; and an interactive element, for example link element, map element or app element, comprised in in the resource content.

According to an aspect of another embodiment, determining the content score value may comprise: determining a content length value indicating a length of the resource content; obtaining a target length value indicating a target length for the resource content; and determining the quantity score value by: calculating a length ratio by dividing the content length value by the target length value; or applying a function to the length ratio such that lower values of the length ratio are amplified and higher values of the length ratio are attenuated.

According to an aspect of another embodiment, the function may be a smooth strictly monotonically increasing function.

According to an aspect of another embodiment, determining the content score value may comprise: determining a language of the resource content; and determining, based on the determined language, the language score value for the resource content.

According to an aspect of another embodiment, determining the content score value may comprise: calculating a weighted word distribution score value by: determining, based on a plurality of words common in the determined language, a word distribution score value for the resource content; and multiplying the word distribution score value by a word distribution weight value; calculating a weighted n gram score value by: determining, based on a plurality of word n-grams common in the determined language, an n-gram distribution score value for the resource content; and multiplying the n-gram distribution score value by an n-gram distribution weight value; calculating a weighted unigram score value by: determining, based on a plurality of word unigrams common in the determined language, a unigram distribution score value for the resource content; and multiplying the unigram distribution score value by a unigram distribution weight value; calculating a weighted bigram score value by: determining, based on a plurality of word bigrams common in the determined language, a bigram distribution score value for the resource content; and multiplying the bigram distribution score value by a bigram distribution weight value; calculating a weighted punctuation score value by: determining, based on the determined language, a punctuation score value for the resource content; and multiplying the punctuation score value by a punctuation weight value; or calculating a weighted spelling score value by: determining, based on the determined language, a spelling score value for the resource content; and multiplying the spelling score value by a spelling weight value; and the language score value may be determined by: averaging at least two of the weighted word distribution score value, weighted n-gram score value, weighted unigram score value, weighted bigram score value, weighted punctuation score value and weighted spelling score value; multiplying at least two of the weighted word distribution score value, weighted n-gram score value, weighted unigram score value, weighted bigram score value, weighted punctuation score value and weighted spelling score value; or multiplying and subsequently potentizing at least two of the weighted word distribution score value, weighted n-gram score value, weighted unigram score value, weighted bigram score value, weighted punctuation score value and weighted spelling score value.

According to an aspect of another embodiment, the resource content may comprise at least one of: a textual element; a structural element, title element, heading element or table element; a media element, graphical element or video element; and an interactive element, link element, map element or app element; at least one of design, layout and arrangement defines the resource content; or the resource content may define a completed resource or partially completed resource.

According to an aspect of yet another embodiment, a system for determining a content score of resource content may comprise one or more processors, when executing on one or more computing devices: being suitable for receiving one or more main topics highly relevant to the resource content; receiving the resource content; determining, using the one or more main topics, a content score value indicating the content score; and outputting the determined content score value.

According to an aspect of yet another embodiment, a computing device for determining a content score of resource content may comprise one or more processors, configured to perform operations; and a memory, coupled to the one or more processors and comprising instructions to cause, when executing on the one or more processors, the computing device to perform operations, comprising: receiving one or more main topics highly relevant to the resource content; receiving the resource content; determining, using the one or more main topics, a content score value indicating the content score; and outputting the determined content score value.

According to an aspect of yet another embodiment, a non-transitory computer-readable storage medium may comprise instructions causing a system to perform operations for determining a content score of resource content, and the operations may comprise: receiving one or more main topics highly relevant to the resource content; receiving the resource content; determining, using the one or more main topics, a content score value indicating the content score; and outputting the determined content score value.

Determining a content score of resource content is a challenge particular to the Internet. The present invention can enable a user, for example an operator of a large number of resources such as webpages, to control aspects comprising relevance, quality, quantity, language and originality of resource content such as new resource content and existing resource content. Moreover, it can provide feedback and/or instructions for improving content. Thus, it can enable the user to control creation of new resource content and optimization of existing resource content. Thus, the present invention can enable the user to cope with the creation and optimization of the resource contents although technical, administrative or financial means may be limited. Further, the present invention can enable the user to concentrate on particular resource content within the large body of resource contents. Furthermore, the present invention can enable the user to save time or to reduce costs.

An advantage of the present invention is that a website creator can use this invention to try out different versions of a webpage and quickly decide which changes to its content make sense and which ones do not without the time-consuming process of testing it directly on the web.

The object and advantages of the embodiments will be realized and achieved at least by steps, elements, features and combinations defined in the claims. Thus, this brief summary and the following detailed description are exemplary and explanatory, and are not restrictive of the invention as defined in the claims.

BRIEF DESCRIPTION OF THE SEVERAL VIEWS OF THE DRAWING

The enclosed drawing depicts various aspects of some embodiments, and is not restrictive of the invention as defined in the claims:

DETAILED DESCRIPTION OF THE INVENTION

Figure 1:
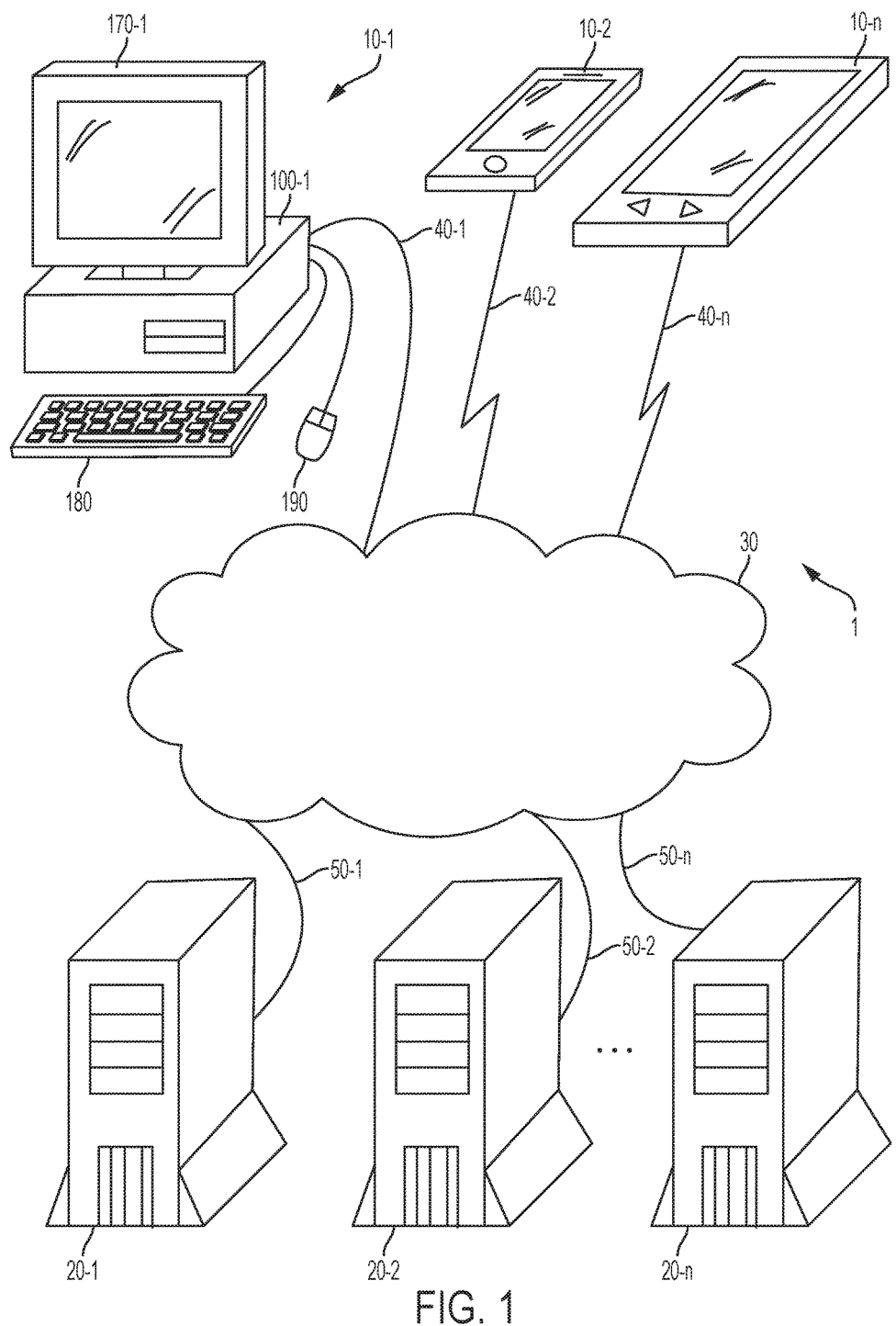
FIG. 1 shows a typical computer network architecture 1 implementing the present invention.

A preferred embodiment of the invention is now described in detail. Referring to the drawing, like reference numbers indicate like parts throughout the views. The drawing shows diagrammatic and schematic representations of some embodiments, is not necessarily drawn to scale, and is not restrictive of the invention. As used in the description and claims, the meaning of "a", "an" and "the" includes plural reference unless the context clearly dictates otherwise.

As used herein, the term "computer network" generally refers to a plurality of interconnected computing devices such as desktop computers, laptop computers, mobile devices like tablet computers, smart phones and smart watches, and servers, interconnected directly or, via network devices such as hubs, routers, switches and gateways, indirectly, for example the Internet. The computer network may comprise wire-based or wireless connections, or both.

As used herein, the term "resource" generally refers to an information source, for example a document such as a static document like hypertext markup language (html) document or dynamically generated document like PHP: Hypertext Preprocessor (php) document, or a software application, such as a software application for a mobile device (mobile app, app), located in one or more computing devices and being accessible, using an identifier of the resource, via the computer network. The term "target resource" generally refers to a resource under test, whereas the term "field resource" generally refers to a resource serving as reference.

As used herein, the term "universal resource locator (URL)" generally refers to an identifier to the resource, specifying its location on the computer network and a mechanism for retrieving it.

As used herein, the term "page" generally refers to a single-page resource. Pages may have different lengths.

As used herein, the term "webpage" generally refers to a page in the World-Wide Web (www).

As used herein, the term "resource contents" generally refers to contents of a resource. The contents may comprise a resource title and a resource corpus. The contents may be comprised of at least one of textual contents, graphical contents, imagery contents, audio contents, and video contents, for example. The resource contents may be intended for a particular market. The market may be defined by a given country and/or given language.

As used herein, the term "contents score" generally refers to a rating of the quality, relevance and originality of the resource contents and, hence, its utility and usefulness. Thus, the contents score may be comprised of at least one of quality score, relevance score and originality score. Further, the rating for textual contents may involve validity and correctness of the contents in a given language, and the contents score may be comprised of at least one of quality score, relevance score, originality score and language score. The term "target contents score" or "target quality value" generally refers to a proposed or desired contents score of resource contents to be created, for example composed or written.

As used herein, the term "contents length" generally refers to an amount of the resource contents. The term "target contents length" or "target quantity value" generally refers to a proposed or desired contents length of resource contents to be created.

As used herein, the terms "content strategy brief", "brief" and "briefing" refer to a proposal for a writer to create or optimize resource contents. The proposal is generated based on and comprises requirements of the resource contents, such as a contents topic, target quality value and target quantity value, and additional information, such as questions, trends, for example forthcoming events, holidays, seasons and festivities, and supplementary resources, for example media and video, relevant to and/or helpful for creation of the proposed resource contents.

As used herein, the term "site" generally refers a plurality of pages accessible via a common domain or subdomain name. Sites are typically operated by companies, governments, organizations, and private individuals, for example. The term target site generally refers to a site under test, whereas the term field site generally refers to a site serving as reference.

As used herein, the term "website" generally refers to a site in the World-Wide Web.

As used herein, the term "network" generally refers to a plurality of resources made available to users via a computer network. The World-Wide Web, for example, is a network.

As used herein, the term "design" generally refers to appearance of the resource, i.e. the presentation of the resource contents. The design determines arrangement of elements constituting the resource contents. The design is based on prescribed structural elements, such as textual elements, for example title elements, heading elements and paragraph elements, and frame elements. As used herein, the term "title" may refer a short textual element shown in a top horizontal bar of a webpage, whereas the term "heading" may refer to a short textual element in a window of the webpage preceding the contents or a paragraph for attracting attention and/or providing guidance, for example.

As used herein, the term "Lorem Ipsum" generally refers to a placeholder or filler in the design for a textual element that has not been created, yet.

As used herein, the term "natural language" refers generally to a human written or spoken language, as opposed to a computer language, and/or more specifically to a language evolving naturally as a means of communication among people, as opposed to an artificial language or a formal language.

As used herein, the term "question word" generally refers to a word introducing a group of words, such as a sentence, in an interrogative form, addressed to someone or something in order to get information in reply. Questions words comprise, in English, "what", "when", "where", "why", "who", "whose", "which", "how", "how much" and "how many", and in German "was", "wann", "wo", "wohin", "warum", "wer", "wessen", "welche", "welcher", "welches", "wie", "wieviel" and "wieviele", for example.

As used herein, the term "keyword" generally refers to a term capturing the essence of a topic of interest or topic of a resource. The keyword may, for example, comprise a word or compound word. The term "commercial keyword" generally refers to a type of keyword having a high probability of bringing prospect customers to a page or site. The term "transactional keyword" generally refers to a type of keyword, like "buy" and "subscribe", having a high probability of bringing determined customers to a page or site. Based on user intention, transactional keywords may be further classified into subcategories comprising "awareness", "consideration" (or "evaluation"), "purchase" (or "decision") and "retention". The term "informational keyword" generally refers to a type of keyword, like a question word such as "what" or "how", indicating search for information and having a low probability of generating revenue. The term "navigational keyword" generally refers to a type of keyword, like a company or brand name, indicating a navigational search for merely finding the page or site of this company or product.

As used herein, the term "topic" generally refers to a subject of resource content, or keyword or keyphrase of a search. Further, the term "main topic" refers a main subject or primary subject being highly relevant to the resource content, for example; the term "relevant topic" such as "San Francisco sightseeing" refers a relevant subject or secondary subject being relevant to the resource content, for example; and the term "additional topic" refers a subordinate subject or third-rate subject being somewhat relevant to the resource content.

As used herein, the term "topic cluster" generally refers to a cluster of similar keywords. The name of a topic cluster may result from the most frequent keyword in a cluster of similar keywords.

As used herein, the term "term frequency-inverse document frequency", or "tf-idf" for short, is a numerical statistic intended to reflect importance of a particular term in a corpus of text or collection of documents. It is a function, such a product, of two statistics: term frequency and inverse document frequency: The term "term frequency" (tf) refers to the number of occurrences of the particular term in a document; wherein the weight of the term in a particular document is proportional to its term frequency. The term "inverse document frequency" (idf) refers an inverse of the number of all documents wherein the particular term occurs, thus, quantifying specificity of the term: wherein weights of very frequently occurring terms such as common terms, for example "a", "the", "is" and "and", are diminished, and, thus, weights of rarely occurring terms are increased.

As used herein, the term "Word2Vec" generally refers to distinct models, comprising the continuous bag-of-words (CBOW) model and the continuous skip-gram model, for producing word embeddings in natural language processing (NLP) by taking a large corpus of text as input and producing a wherein each unique word in the corpus is assigned to a corresponding word vector in the space. The word vectors are positioned in the space such that words that share common contexts in the corpus are located in close proximity to one another in the space. The models may be implemented by shallow, two-layer neural networks trained to reconstruct linguistic contexts of words.

As used herein, the term "n-gram" generally refers to a sequence of n adjacent elements from a sequence of elements, wherein the elements may comprise letters, syllables or words, for example. Thus, the term "unigram" generally refers to a single element from a sequence of elements (n-gram of size 1). Similarly, the term "bigram", or "digram", generally refers to a sequence of two adjacent elements (n-gram of size 2), and the term "trigram" generally refers to a sequence of three adjacent elements (n-gram of size 3).

As used herein, the term "organic search" generally refers to searching, in response to a query comprising one or more keywords (keyword query), relevant information. A search usually comprises adding attribution information, then filtering it, and then sorting it. Search algorithms comprise the CheiRank (sorting) algorithm and PageRank (sorting) algorithm. The results of the organic search are generally ranked by relevance to the query.

As used herein, the term "search engine" generally refers to a software application for searching information on a network using organic search. Search engines include Google.com, Baidu.com and Yandex.com.

As used herein, the term "crawler" generally refers to a software application executable on a computing device for systematically browsing a network, typically for indexing sites for a search engine.

As used herein, the term "browser" generally refers to a software application executable on a computing device for enabling a computer user to navigate, or surf, a network.

As used herein, the term "search engine results page(s) (SERP(s))" generally refers to one or more pages generated by a search engine in response to a query received from a user via a computing device, returned to the computer device and displaying the ranked results in a browser on the computing device. In addition to results of the organic search, the pages typically further comprise sponsored results, i.e. advertisements relating to the query and paid for by advertisers (keyword advertising).

As used herein, the term "search engine marketing (SEM)" generally refers to marketing on search engine results pages, like keyword advertising.

As used herein, the term "conversion" generally refers to a user decision resulting in an operator-intended or marketing-intended action, such as a transaction, e.g. purchase.

As used herein, the term "cost per click (CPC)" refers to the cost in pay-per-click (PPC) marketing, a type of paid marketing where the advertiser has to pay to the affiliate when the user follows a link in the advertiser's advertisement. The advertisement may be one of the sponsored results, for example.

As used herein, the term "social network" generally refers to a network, like Facebook.com and Twitter.com, enabling its users to upload and consume, hence, share contents like messages, audio contents or video contents. Users may provide feedback on the contents by posting comments and sending social signals, like Facebook's Likes.

As used herein, the term "social media marketing (SMM)" generally refers to marketing on social networks, like viral videos.

As used herein, the term "marketplace" generally refers to a network, like Amazon.com and Tmall.com, offering products and services for rent or sale. Typically, a marketplace comprises a plurality of resources, each of which being dedicated to one or more products or services. Thus, a marketplace, for example, may comprise hundreds, thousands or millions of resources.

As used herein, the term "video platform" generally refers to a network, like Youtube.com and Vimeo.com, enabling its users to upload and consume, and, hence, share video contents.

As used herein, the term "app store" generally refers to a network, like Apple's iTunes App Store and Google's Play Store, enabling developers to distribute their software applications for computer devices, for example mobile apps.

As used herein, the term "link building" generally refers to methods aiming to increase the number and quality links on pages pointing to the page or site.

As used herein, the term "search engine optimization (SEO)" generally refers to methods aiming to improve the position of a page or site in the ranked results. The methods include direct on-page optimization amending the page or site itself, and indirect off-page optimization including link building, search engine marketing, social media marketing.

As used herein, the term "contextual network", or content network, generally refers to a subnetwork of related resources in a network, the subnetwork providing services, like search engines, or contents, like social networks, marketplaces, video platforms and app stores. Typically, contextual networks, like Google AdWords and Facebook Ads, place context-specific advertisement across their pages.

As used herein, the term "performance" generally refers to a network-specific resource and its utility, usefulness and, hence, score and ranking. The performance of a target resource may be represented relative to the performance of a field resource.

As used herein, the term "performance metrics" generally refers to a network-specific resource and its metrics. The term keyword-related performance metrics generally refers to a metrics relating to a keyword, like search volume of the keyword and cost-per-click of the keyword. The term traffic-related performance metrics generally refers to a metrics relating to traffic, like traffic volume of the resource and traffic speed of the resource. The term context-related performance metrics generally refers to a metrics relating to a contextual network, like volume of social signals.

As used herein, the term "performance potential", or "potential performance", generally refers to a network-specific resource and its ability to increase its utility and usefulness, and to climb in scores and rankings. Thus, a resource being already at the top of a ranking or most popular has no potential to climb further. The performance potential of a target resource may be represented relative to the performance of a field resource.

For determining a content score of resource content such as contents of electronic resources or digital resources like webpages, software applications, apps and app stores in a network such as the www, a computer such as a server computer coupled to the network may comprise a processor such as microprocessor, configured to perform operations; and a memory such as main memory, coupled to the processor and comprising instructions such as machine instructions. The instructions, when executed in the computer, i.e. by the processor, may cause the operations of crawling the network and acquiring contents from the resources in the network; determining performance metrics, such as keywords, search volumes of the keywords, topics, costs-per-click of the keywords, traffics volumes of the resources, traffic speeds of the resources, context-related performance metrics relating contextual networks such as social networks like Facebook.com and marketplace like Amazon.com, volumes of social signals of the resources, numbers of back-links to the resources, ratings of the resources, search-engine-optimization values of the resources, and bounce rates and click-through rates, characterizing the resources; and storing the performance metrics in the memory, for example in a data base in the memory.

The instructions may cause the operations of outputting the performance metrics. The performance metrics may be suitably represented, for example, as bar graphs, pie charts, bubble charts, traffic-light rating like red amber green (RAG) rating or any combination thereof. The output may be presented to the user via the web browser on the other computer.

The instructions may cause the operations of determining a content score of resource content. The content score may be determined automatically, semi-automatically or manually.

FIG. 1 shows a typical computer network architecture 1 implementing the present invention. The typical computer network architecture 1 may comprise a plurality of client computing devices 10-1, . . . 10-n, a plurality of server computing devices 20-1, . . . 20-n and a network 30 such as the Internet.

The plurality of client computing devices 10-1, . . . 10-n may comprise one or more stationary computing devices 10-1. One or more of the stationary computing devices 10-1 may, for example, comprise a desktop computer 100-1, a display 170-1 coupled to the desktop computer 100-1, an input device 180 such as a keyboard coupled to the desktop computer 100-1 and a pointing device 190 such as a mouse 190, joystick, trackball and touchpad coupled to the desktop computer 100-1. One or more of the stationary computing devices 10-1 may be coupled to the network 30 via a connection such as wire-based connection 40-1. The plurality of client computing devices 10-1, . . . 10-n may comprise one or more mobile computing devices 10-2, . . . 10-n such as a smart phone 10-2 or a tablet computer 10-n. One or more of the mobile computing devices 10-2, . . . 10-n may be coupled to the network 30 via a connection such as wireless connection 40-1, 40-n. The client computing devices 10-1, . . . 10-n may, for example, be implemented by a typical computer device architecture 10 as described with reference to FIG. 2.

The plurality of server computing devices 20-1, . . . 20-n may, for example, comprise one or more tower servers, one or more rack servers, or any combination thereof. One or more of the plurality of server computing devices 20-1, . . . 20-n may be coupled to the network 30 via a connection such as wire-based connection 50-1, . . . 50-n. The server computing devices 20-1, . . . 20-n may, for example, be implemented by a typical computer device architecture 10 as described with reference to FIG. 2.

The network 30 may comprise one or more hubs, switches, routers and the like. Thus, users of the plurality of client computing devices 10-1, . . . 10-n may, for example, access software such as data or programs stored in plurality of server computing devices 20-1, . . . 20-n via the network 30.

Figure 2:
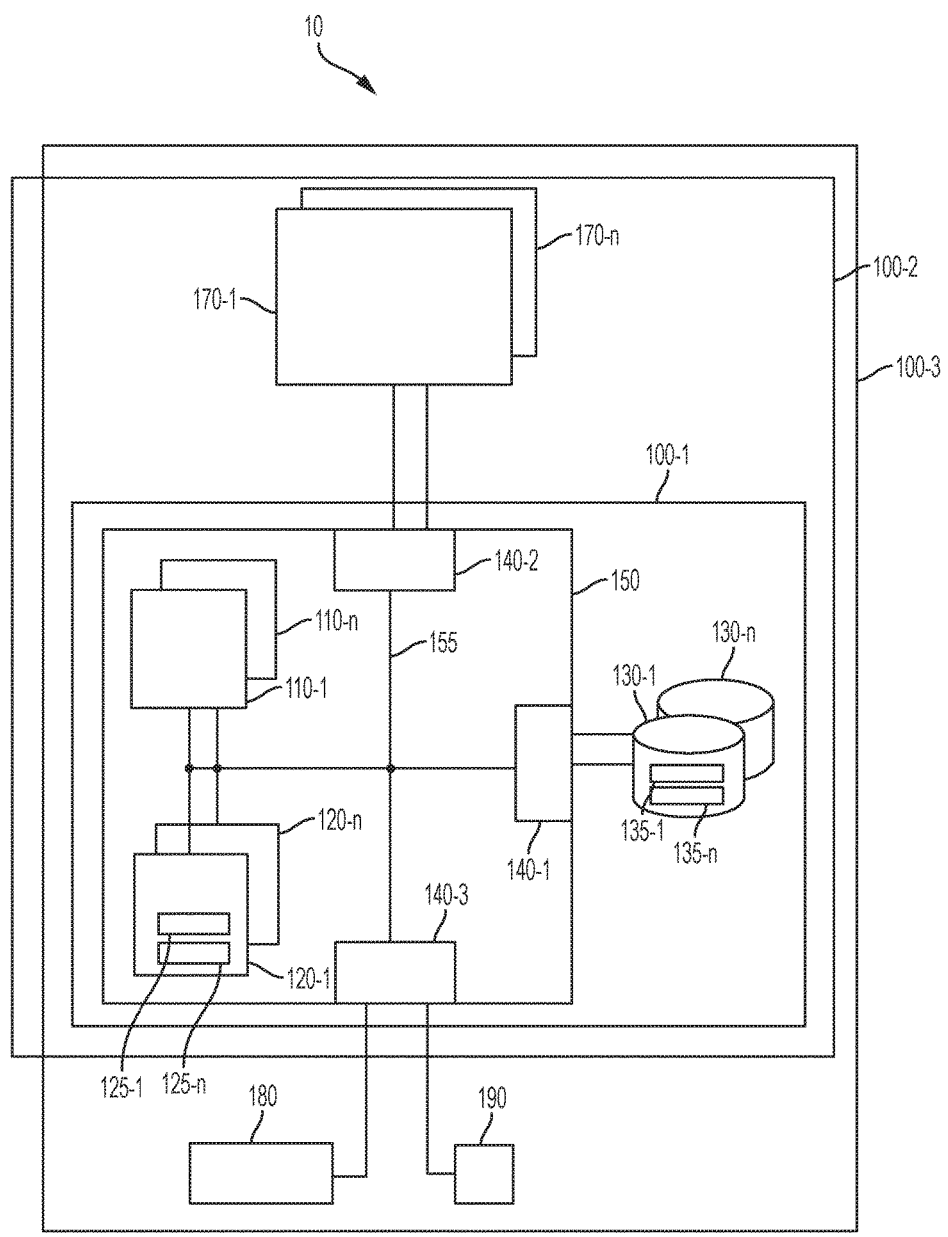
FIG. 2 shows a typical computer device architecture 10 implementing the present invention.

FIG. 2 shows a typical computer device architecture 10 implementing the present invention. The typical computer device architecture 10 may comprise one or more processors 110-1, . . . 110-n, one or more memories 120-1, . . . 120-n coupled to the one or more processors 110-1, . . . 110-n, and one or more interfaces 140-1, . . . 140-3 coupled to the one or more processors 110-1, . . . 110-n.

The one or more processors 110-1, . . . 110-n may execute instructions of programs, for example, comprise a microprocessor, an application-specific integrated circuit (ASIC), an application-specific instruction set processor (ASIP), a digital signal processor (DSP), a co-processor, or any combination thereof. The one or more processors 110-1, . . . 110-n may, for example, comprise a single-core processor, multi-core processor such as quad-core processor, or any combination thereof. The one or more processors 110-1, . . . 110-n may, for example, be implemented by microcontrollers or field programmable gate arrays (FPGAs).

The one or more memories 120-1, . . . 120-n may store software items 125-1, . . . 125-n such as data or programs likes databases and, for example, comprise volatile memory such as random-access memory (RAM) and static RAM (SRAM), non-volatile memory such as read-only memory (ROM), electrically erasable programmable ROM (EEPROM) and Flash memory, or any combination thereof. The one or more interfaces 140-1, . . . 140-3 may, for example, comprise parallel interfaces, serial interfaces, universal serial bus (USB) interfaces, or any combination thereof.

The one or more processors 110-1, . . . 110-n, one or more memories 120-1, . . . 120-n and one or more interfaces 140-1, . . . 140-3 may be arranged on a circuit board such as printed circuit board (PCB) 150 comprising connections such as a bus 155 coupling the one or more processors 110-1, . . . 110-n, one or more memories 120-1, . . . 120-n and one or more interfaces 140-1, . . . 140-3.

The typical computer device architecture 10 may comprise one or more data storages 130-1, . . . 130-n such as hard disk drives (HDDs, hard disks, hard drives), solid-state drives (SSDs), Compact Disc ROM (CD-ROM) drives, or any combination thereof. The one or more data storages 130-1, . . . 130-n may store software items 135-1, . . . 135-n such as data or programs likes databases. The one or more data storages 130-1, . . . 130-n may, for example, comprise fixed data storages, removable data storages, or any combination thereof. The one or more data storages 130-1, . . . 130-n may be coupled to the one or more processors 110-1, . . . 110-n via a storage interface 140-1 of the one or more interfaces 140-1, . . . 140-3.

The typical computer device architecture 10 may comprise one or more displays 170-1, . . . 170-n such as cathode ray tube (CRT) displays, liquid-crystal displays (LCDs), organic light-emitting diode (OLED) displays, or any combination thereof. The one or more data storages 170-1, . . . 170-n may be coupled to the one or more processors 110-1, . . . 110-n via a display interface 140-2 of the one or more interfaces 140-1, . . . 140-3.

The typical computer device architecture 10 may comprise an input device 180 such as a keyboard coupled to the one or more processors 110-1, . . . 110-n via a input interface 140-3 of the one or more interfaces 140-1, . . . 140-3. The typical computer device architecture 10 may comprise a pointing device 190 such as a mouse, joystick, trackball and touchpad coupled to the one or more processors 110-1, . . . 110-n via the input interface 140-3.

The desktop computer 100-1, for example, may comprise the one or more processors 110-1, . . . 110-n, one or more memories 120-1, . . . 120-n, one or more interfaces 140-1, . . . 140-3, PCB 150 and one or more data storages 130-1, . . . 130-n. An all-in-one computer 100-2, for example, may comprise the one or more processors 110-1, . . . 110-n, one or more memories 120-1, . . . 120-n, one or more interfaces 140-1, . . . 140-3, PCB 150, one or more data storages 130-1, . . . 130-n and one or more displays 170-1, . . . 170-n. A notebook computer 100-3, for example, may comprise the one or more processors 110-1, . . . 110-n, one or more memories 120-1, . . . 120-n, one or more interfaces 140-1, . . . 140-3, PCB 150, one or more data storages 130-1, . . . 130-n, one or more displays 170-1, . . . 170-n, input device 180 and pointing device 190. The typical computer device architecture 10 may further comprise a power supply (not shown) such as mains adapter, battery, or any combination thereof.

Figure 3:
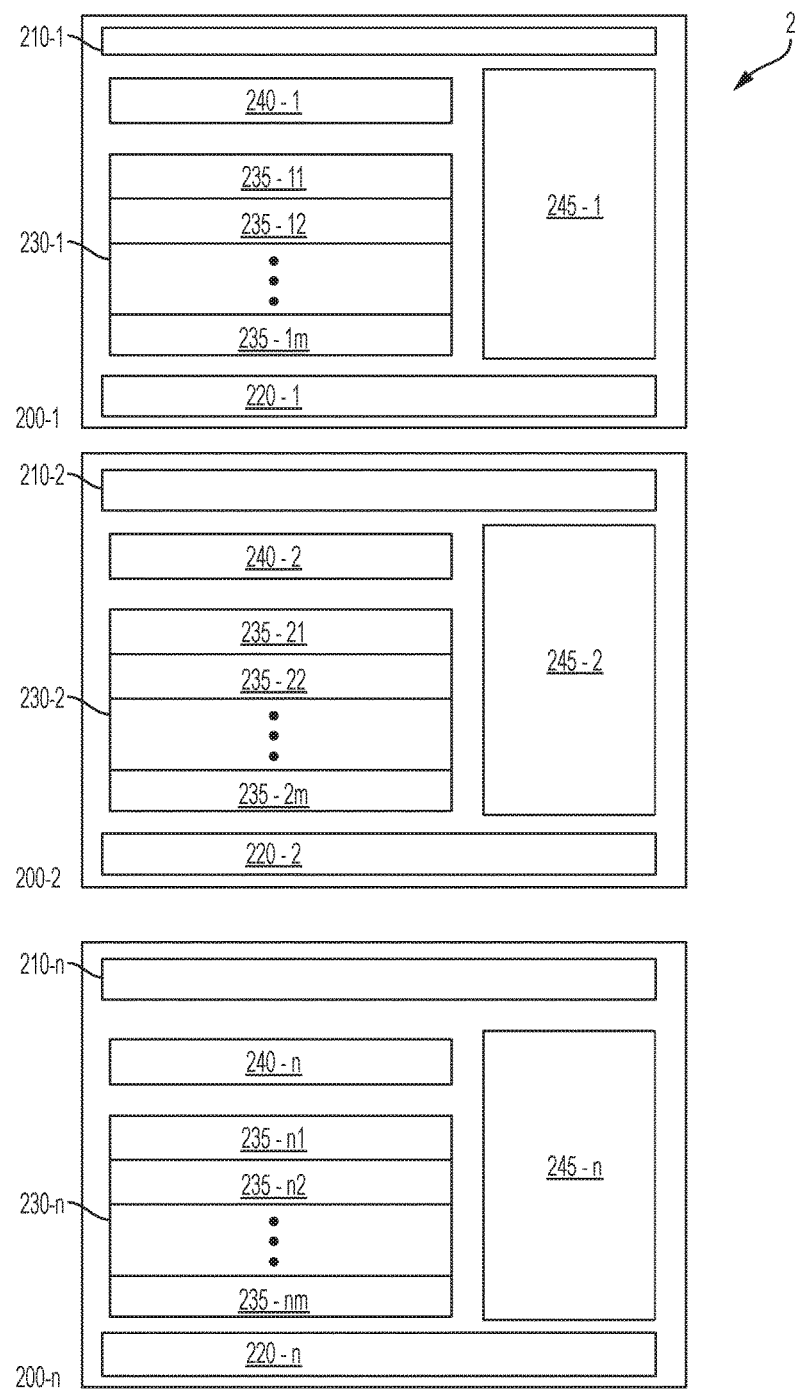
FIG. 3 shows typical search engine results 2 implementing the present invention.

FIG. 3 shows typical search engine results 2 implementing the present invention. The typical search engine results 2 may comprise a plurality of on-screen SERPs 200-1, . . . 200-n comprising a first SERP 200-1, a second SERP 200-2 and subsequent SERP 200-n generated by a search engine.

Each of the plurality of SERPs 200-1, . . . 200-n may comprise a query section 210-1, . . . 210-n for receiving one or more keywords and one or more search instructions from a user. As shown in FIG. 3, the query section 210-1, . . . 210-n may be rectangular. It may extend partially or fully across the SERP 200-1, . . . 200-n. It may be arranged towards a top margin of the SERP 200-1, . . . 200-n.

Each of the plurality of SERPs 200-1, . . . 200-n may comprise a navigation section 220-1, . . . 220-n for receiving navigational instructions from the user, such as a plurality of on-screen buttons each of which being assigned on one of the plurality of SERPs 200-1, . . . 200-n. As shown in FIG. 3, the navigation section 220-1, . . . 220-n may be rectangular. It may extend partially or fully across the SERP 200-1, . . . 200-n. It may be arranged towards a bottom margin of the SERP 200-1, . . . 200-n.

Each of the plurality of SERPs 200-1, . . . 200-n may comprise an organic search result section 230-1, . . . 230-n for displaying one or more organic search results to the user. As shown in FIG. 3, the organic search result section 230-1, . . . 230-n may be rectangular. It may extend partially or fully along the SERP 200-1, . . . 200-n. It may be arranged towards a left margin of the SERP 200-1, . . . 200-n. The organic search result section 230-1, . . . 230-n may comprise a plurality of individual organic search result sections 235-11, . . . 235-1m, 235-21, . . . 235-2m, 235-n1, . . . 235-nm comprising a first individual organic search result section 235-11, 235-21, . . . 235-n1, a second individual organic search result section 235-12, 235-22, . . . 235-n2, and subsequent individual organic search result sections 235-1m, 235-2m, 235-nm. The plurality of organic search result sections 230-1, . . . 230-n may have different numbers m of individual organic search result sections 235-11, . . . 235-1m, 235-21, . . . 235-2m, 235-n1, . . . 235-nm. The search engine may rank the organic search results according to their relevance to the one or more keywords. The search engine may assign to each of the individual organic search result sections 235-11, . . . 235-1m, 235-21, . . . 235-2m, 235-n1, . . . 235-nm one of the organic search results. Thus, a most relevant organic search result may be assigned to the first individual organic search result section 235-11 on the first SERP 200-1, a second most relevant organic search result may be assigned to the second individual organic search result section 235-12 on the first SERP 200-1, an m-th most relevant organic search result may be assigned to the m-th individual organic search result section 235-1m on the first SERP 200-1, an (m+1)-th most relevant organic search result may be assigned to the first individual organic search result section 235-21 on the second SERP 200-2, and so on.

Traffic resulting from searches generally divides into, on the first SERP 200-1, 10% for the most relevant organic search result, 8% for the second most relevant organic search result, 6% for the third most relevant organic search result, 3% for the fourth most relevant organic search result, . . . 0.5% for the tenth most relevant organic search result, on the second SERP 200-2, 0.05% for the eleventh most relevant organic search result.

Performance potentials are generally, on the first SERP 200-1, 0% for both the most relevant organic search result and the second most relevant organic search result, in case of a navigational keyword 0% or in case of a transactional or informational keyword 10% for both the third and fourth most relevant organic search results, 15% for both the fifth and sixth most relevant organic search results, 25% for each of the seventh, eighth, ninth and tenth most relevant organic search results, and on the second SERP 200-2, 500% for both the eleventh and twelfth organic search results, i.e. a move from the second SERP 200-2 to the first SERP 200-1.

Each of the plurality of SERPs 200-1, . . . 200-n may comprise one or more sponsored search result sections 240-1, . . . 240-n for displaying one or more sponsored search results to the user. As shown in FIG. 3, the sponsored search result sections 240-1, . . . 240-n may be rectangular. They may extend partially or fully along the SERP 200-1, . . . 200-n. A s shown in FIG. 3, the search result sections 240-1, . . . 240-n may be arranged towards the left margin of the SERP 200-1, . . . 200-n, or the right margin, for example.

Each of the plurality of SERPs 200-1, . . . 200-n may comprise one or more integration sections 245-1, . . . 245-n for displaying one or more search engine integrations, i.e. additional contents compiled and/or provided by the search engine, to the user. As shown in FIG. 3, the integration sections 245-1, . . . 245-n may be rectangular. They may extend partially or fully along the SERP 200-1, . . . 200-n. A s shown in FIG. 3, the integration sections 245-1, . . . 245-n may be arranged towards the right margin of the SERP 200-1, . . . 200-n, or the left margin, for example.

Figure 4:
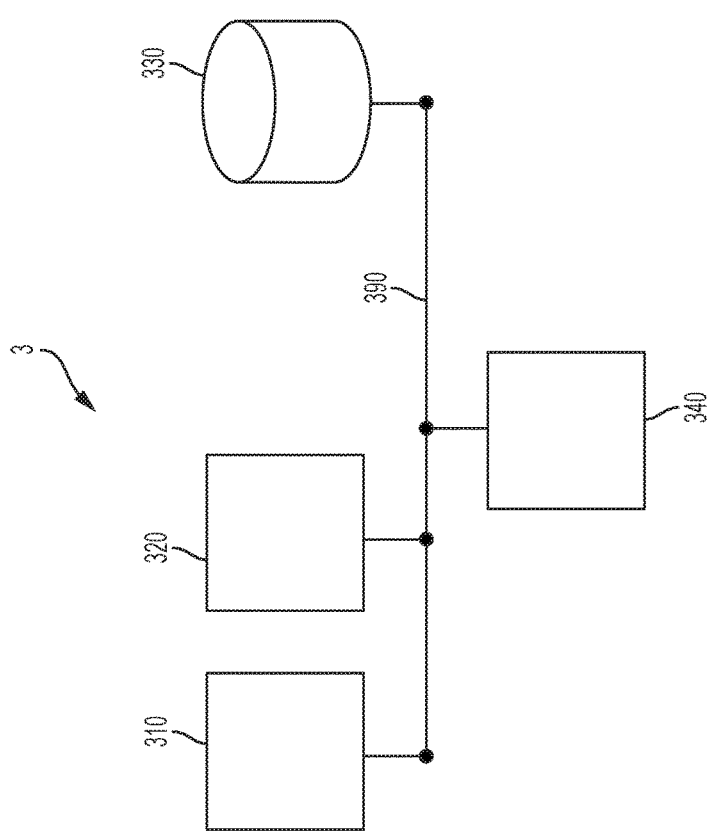
FIG. 4 shows a resource management architecture 3 implementing the present invention.

FIG. 4 shows a resource management architecture 3 implementing the present invention. The resource management architecture 3 may, for example, be implemented in a stand-alone resource management system, content management system (CMS), writing tool such as editor, writing assistance tools, or research tool such as online research tool. The resource management architecture 3 may comprise a plurality of modules such as software modules, hardware modules, or any combination thereof. The plurality of modules may be executed on the one or more computing devices 10 such as server computing devices 20-1, . . . 20-n, or provided as a service, that may be implemented as a cloud service. The software modules may comprise programs such as machine code, or compiled or interpreted code. The hardware modules may comprise dedicated hardware such as ASICs and FPGAs. Two or more modules of plurality of modules may be coupled to each other via one or more connections such as a module bus 390.

The resource management architecture 3 may comprise a crawler module 310. The crawler module 310 may automatically crawl a network and acquire contents from one or more resources in the network, or acquire the contents from an open repository of web crawl data such as CommonCrawl.org.

The resource management architecture 3 may comprise a determiner module 320. The determiner module 320 may automatically determine performance metrics characterizing each of the one or more resources of the crawled network. The performance metrics may comprise one or more main topics being highly relevant to the one or more resources.

The resource management architecture 3 may comprise a data base module 330. The data base module 330 may automatically store the determined performance metrics as pre-stored performance metrics.

The resource management architecture 3 may comprise a processing module 340 for determining a content score of resource content.

The processing module 340 may automatically receive one or more main topics highly relevant to the resource content; receive the resource content; determine, using the one or more main topics, a content score value indicating the content score; and output the determined content score value.

The processing module 340 may automatically determine candidate content for addition to or deletion from the resource content; and output the candidate content. Thus, resource management architecture 3 may assist in improving the resource content.

The processing module 340 may automatically determine instructions, for example textual instructions or graphical instructions for improving the resource content; and output the instructions, for example textual instructions or graphical instructions.

The processing module 340 may automatically return to receiving the resource content; determine whether the resource content has changed; and, in case that the resource contents has changed, return to determining the content score value. Thus, resource management architecture 3 may provide feedback to a user, i.e. writer such as freelance writer or author while writing.

The processing module 340 may determine the content score value by determining at least one of a relevance score value, a quality score value, a quantity score value, a language score value and an originality score value for the resource content; and calculating the content score value from at least one of the relevance score value, quality score value, quantity score value, language score value and originality score value.

The processing module 340 may calculate the content score value by summing at least two of the relevance score value, quality score value, quantity score value, language score value and originality score value. The processing module 340 may calculate the content score value by averaging at least two of the relevance score value, quality score value, quantity score value, language score value and originality score value.

The processing module 340 may calculate the content score value by calculating at least one of a weighted relevance score value by multiplying the relevance score value by a relevance weight value; a weighted quality score value by multiplying the quality score value by a quality weight value; a weighted quantity score value by multiplying the quantity score value by a quantity weight value; a weighted language score value by multiplying the language score value by a language weight value; and calculating a weighted originality score value by multiplying the originality score value by a originality weight value. The weight values, for example the relevance weight value, quality weight value, quantity weight value and language weight value, may be pre-determined, or pre-defined, weight values, or determined, or generated, weight values. The weight values may be determined using machine learning such as automatic machine learning. The machine learning may comprise at least one of a deep-learning model such as convolutional neural network (CNN) and generalized boosted model (GBM). The processing module 340 may calculate the content score value by averaging at least two of the weighted relevance score value, weighted quality score value, weighted quantity score value, weighted language score value and weighted originality score value.

The processing module 340 may calculate the content score value by determining whether the relevance score value is below a relevance threshold value; determining whether the quality score value is below a quality threshold value; determining whether quantity score value is below a quantity threshold value; determining whether the language score value is below a language threshold value; or determining whether the originality score value is below an originality threshold value. The threshold values, for example the threshold value, quality threshold value, quantity threshold value, language threshold value and originality threshold value, may be pre-determined, or pre-defined, threshold values, or determined, or generated, threshold values. As already described for the weight values, the threshold values may be determined using machine learning. The processing module 340 may calculate the content score value by, in case that at least one of the relevance score value, quality score value, quantity score value, language score value and originality score value is below its threshold value, reducing the content score value to a predetermined value or by a predetermined amount. Thus, the resource management architecture 3 may recognize and/or avoid an acceptable content score although one or more sub scores are unacceptable.

The processing module 340 may automatically obtain, from a plurality of resources, one or more relevant topics relevant to the resource content; wherein the relevance score value is determined using the one or more relevant topics.

The processing module 340 may automatically convert the resource content into one or more content vectors. The processing module 340 may automatically convert the one or more main topics into one or more main-topic vectors. The processing module 340 may automatically convert the one or more relevant topics into a plurality of relevant-topic vectors. The processing module 340 may automatically determine, for the one or more main-topic vectors, one or more main-topic similarity values indicating similarity to the one or more content vectors. The processing module 340 may automatically determine, for the one or more relevant-topic vectors, one or more relevant-topic similarity values indicating similarity to the one or more content vectors. The processing module 340 may determine the relevance score value by aggregating the one or more main-topic similarity values. The processing module 340 may determine the relevance score value by aggregating the one or more relevant-topic similarity values.

The processing module 340 may obtain the one or more relevant topics by obtaining the plurality of resources, the one or more main topics being highly relevant to each of the plurality of resources; and generating the one or more relevant topics from the plurality of resources, the one or more relevant topics being relevant to the plurality of resources.

The processing module 340 may determine the content score value by obtaining a brief for the resource content. The brief may comprise a plurality of essential-term target values for a plurality of essential terms; a plurality of relevant-term target values for a plurality of relevant terms; and/or a plurality of additional-term target values for a plurality of additional terms. The processing module 340 may determine the content score value by determining a plurality of essential-term count values by counting occurrence of each of the plurality of essential terms in the resource content. The processing module 340 may determine the content score value by determining a plurality of relevant-term count values by counting occurrence of each of the plurality of relevant terms in the resource content. The processing module 340 may determine the content score value by determining a plurality of additional-term count values by counting occurrence of each of the plurality of additional terms in the resource content. The processing module 340 may determine the content score value by calculating an relevant-term ratio by dividing, for each of the plurality of essential terms, the relevant-term count value by the relevant-term target value. The processing module 340 may determine the content score value by calculating an essential-term ratio by dividing, for each of the plurality of essential terms, the essential-term count value by the essential-term target value. The processing module 340 may determine the content score value by calculating an additional-term ratio by dividing, for each of the plurality of additional terms, the additional-term count value by the additional-term target value. The processing module 340 may determine the content score value by calculating a weighted essential-term value by multiplying the essential-term ratio by an essential-term weight value. The processing module 340 may determine the content score value by calculating a weighted relevant-term value by multiplying the relevant-term ratio by a relevant-term weight value. The processing module 340 may determine the content score value by calculating a weighted additional-term value by multiplying the additional-term ratio by an additional-term weight value. The weight values, for example the essential-term weight value, relevant-term weight value and additional-term weight value, may be pre-determined, or pre-defined, weight values, or determined, or generated, weight values. As already described, the weight values may be determined using machine learning. The processing module 340 may determine the relevance score value by averaging at least two of the weighted essential-term value, weighted relevant-term value and weighted additional-term value. The processing module 340 may determine the relevance score value by multiplying at least two of the weighted essential-term value, weighted relevant-term value and weighted additional-term value. The processing module 340 may determine the relevance score value by multiplying and subsequently potentizing at least two of the weighted essential-term value, weighted relevant-term value and weighted additional-term value.

The processing module 340 may determine the relevance score value using at least one of a textual element; a structural element, for example title element, heading element or table element; a media element, for example graphical element or video element; and an interactive element, for example link element, map element or app element, comprised in in the resource content. Thus, the resource management architecture 3 may promote particular keywords needing more-than-normal visual information such as imager or videos, for example.

The processing module 340 may determine the content score value by determining a content length value indicating a length of the resource content; obtaining a target length value indicating a target length for the resource content; and determining the quantity score value The processing module 340 may determine the quantity score value by calculating a length ratio by dividing the content length value by the target length value. The processing module 340 may determine the quantity score value by applying a function to the length ratio such that lower values of the length ratio are amplified and higher values of the length ratio are attenuated. The function may be a smooth strictly monotonically increasing function, as described in more detail with reference to FIG. 8.

The processing module 340 may determine the content score value by determining a language of the resource content; and determining, based on the determined language, the language score value for the resource content. Thus, the resource management architecture 3 may ensure valid content and/or correct content. For valid and correct content, the language score should be high, i.e. 100%. Although the language score may provide for some tolerance, it should be low, i.e. 0%, for content comprising, for example, randomized content, filler content or numerous errors.

The processing module 340 may determine the content score value by calculating a weighted word distribution score value by determining, based on a plurality of words common in the determined language, a word distribution score value for the resource content; and multiplying the word distribution score value by a word distribution weight value. The processing module 340 may determine the content score value by calculating a weighted n-gram score value by determining, based on a plurality of word n-grams common in the determined language, an n-gram distribution score value for the resource content; and multiplying the n-gram distribution score value by an n-gram distribution weight value. The processing module 340 may determine the content score value by calculating a weighted unigram score value by determining, based on a plurality of word unigrams common in the determined language, a unigram distribution score value for the resource content; and multiplying the unigram distribution score value by a unigram distribution weight value. The processing module 340 may determine the content score value by calculating a weighted bigram score value by determining, based on a plurality of word bigrams common in the determined language, a bigram distribution score value for the resource content; and multiplying the bigram distribution score value by a bigram distribution weight value. The processing module 340 may determine the content score value by calculating a weighted punctuation score value by determining, based on the determined language, a punctuation score value for the resource content; and multiplying the punctuation score value by a punctuation weight value. The processing module 340 may determine the content score value by calculating a weighted spelling score value by determining, based on the determined language, a spelling score value for the resource content; and multiplying the spelling score value by a spelling weight value. The weight values, for example word distribution weight value, n-gram distribution weight value, unigram distribution weight value, bigram distribution weight value and punctuation weight value, may be pre-determined, or pre-defined, weight values, or determined, or generated, weight values. As already described, the weight values may be determined using machine learning. The processing module 340 may determine the language score value by averaging at least two of the weighted word distribution score value, weighted n-gram score value, weighted unigram score value, weighted bigram score value, weighted punctuation score value and weighted spelling score value. The processing module 340 may determine the language score value by multiplying at least two of the weighted word distribution score value, weighted n-gram score value, weighted unigram score value, weighted bigram score value, weighted punctuation score value and weighted spelling score value. The processing module 340 may determine the language score value by multiplying and subsequently potentizing at least two of the weighted word distribution score value, weighted n-gram score value, weighted unigram score value, weighted bigram score value, weighted punctuation score value and weighted spelling score value.

The resource content may comprise at least one of a textual element; a structural element, for example title element, heading element or table element; a media element, for example graphical element or video element; and an interactive element, for example link element, map element or app element. The resource content may be defined by at least one of design, layout, i.e. appearance of the resource, and arrangement, i.e. positions of structural elements. The resource content may define a completed resource or partially completed resource.

The user, i.e. writer such as freelance writer or author, of the client computing device may determine the content score of the resource content in the network. The resource management architecture 3 may determine the content score of the resource content, preferably while the user is creating, editing or optimizing the resource content, i.e. in real time. Thus, the resource management architecture 3 may assist and guide the user by ascertaining qualities of the resource content.

Figure 5:
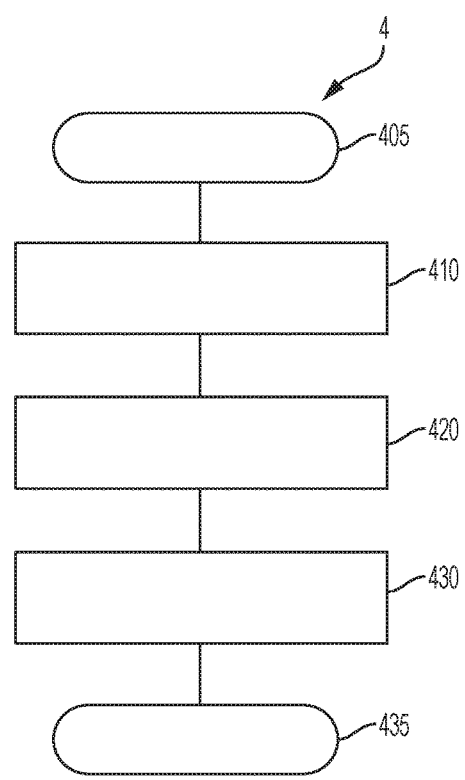
FIG. 5 shows a flow chart of a pre-process 4 for determining a content score of resource content in a network according to an embodiment of the present invention.

FIG. 5 shows a flow chart of a pre-process 4 for determining a content score of resource content in a network according to an embodiment of the present invention. The pre-process 4 obtains performance metrics and stores same for subsequent determination of a content score of the resource content in the network.

The pre-process 4 for determining a content score of resource content in a network starts at step 405.

Following step 405, the pre-process 4 comprises step 410. In step 410, the pre-process 4 may automatically crawl the network and acquire resource contents from one or more resources in the network.

Following step 410, the pre-process 4 comprises step 420. In step 420, the pre-process 4 may automatically determine performance metrics characterizing each of one or more resources of the crawled network. The pre-process 4 may determine one or more main topics being highly relevant to the one or more resources.

Following step 420, the pre-process 4 comprises step 430. In step 410, the pre-process 4 may automatically store the determined performance metrics as pre-stored performance metrics.

The pre-process 4 for analyzing the resources in the network ends at step 435.

Figure 6:
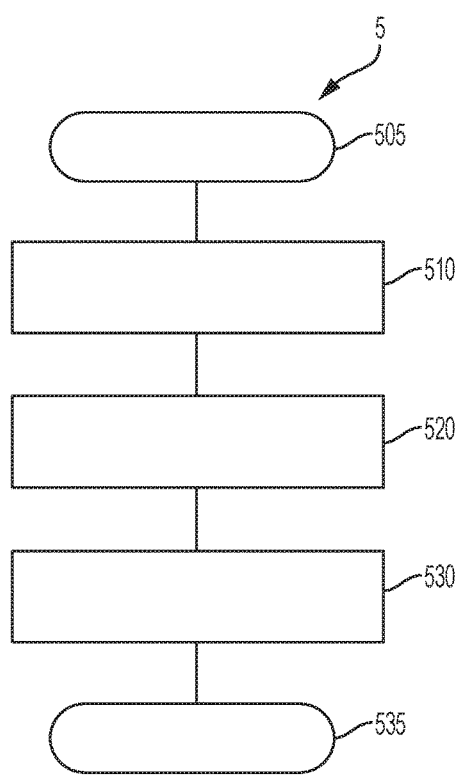
FIG. 6 shows a simplified flow chart of a process 5 for determining a content score of resource content in a network according to an embodiment of the present invention.

FIG. 6 shows a simplified flow chart of a process 5 for determining a content score of resource content in a network according to an embodiment of the present invention.

The process 5 for determining a content score of resource content in the network starts at step 505. Following step 505, the process 5 comprises step 510. In step 510, the process 5 may require user authentication from a user. The user authentication may be implemented as single-factor authentication, two-factor authentication or multi-factor authentication, for example. The process 5 may receive the resource content; and one or more main topics highly relevant to the resource content from the user.

Following step 510, the process 5 comprises step 520. In step 520, the process 5 may determine, using the one or more main topics, a content score value indicating the content score. The process 5 may determine the content score value as described with reference to FIG. 4

Following step 520, the process 5 comprises step 530. In step 530, the process 5 may output the determined content score value to the user. The output may be in the form of a document, such as .doc, .docx or .pdf document, or webpage such as .HTML file, for example.

The process 5 for determining a content score of resource content in the network ends at step 535.

Thus, the process 5 for determining a content score of resource content in a network provides the user, such as a content strategist, content marketing manager, online marketing manager, editor, chief editor, freelancer or owner of a small business, with a content score for new resource content or existing resource content. The resource will rank high in organic search results for the relevant topics and, thus, attract more visits of the resource, in a quick and reliable way, without manual or additional research. The process 5 may output the content score as overall content score value. The process 5 may, additionally or alternatively, output one or more content score values indicating one or more individual aspects of the content resource.

Figure 7:
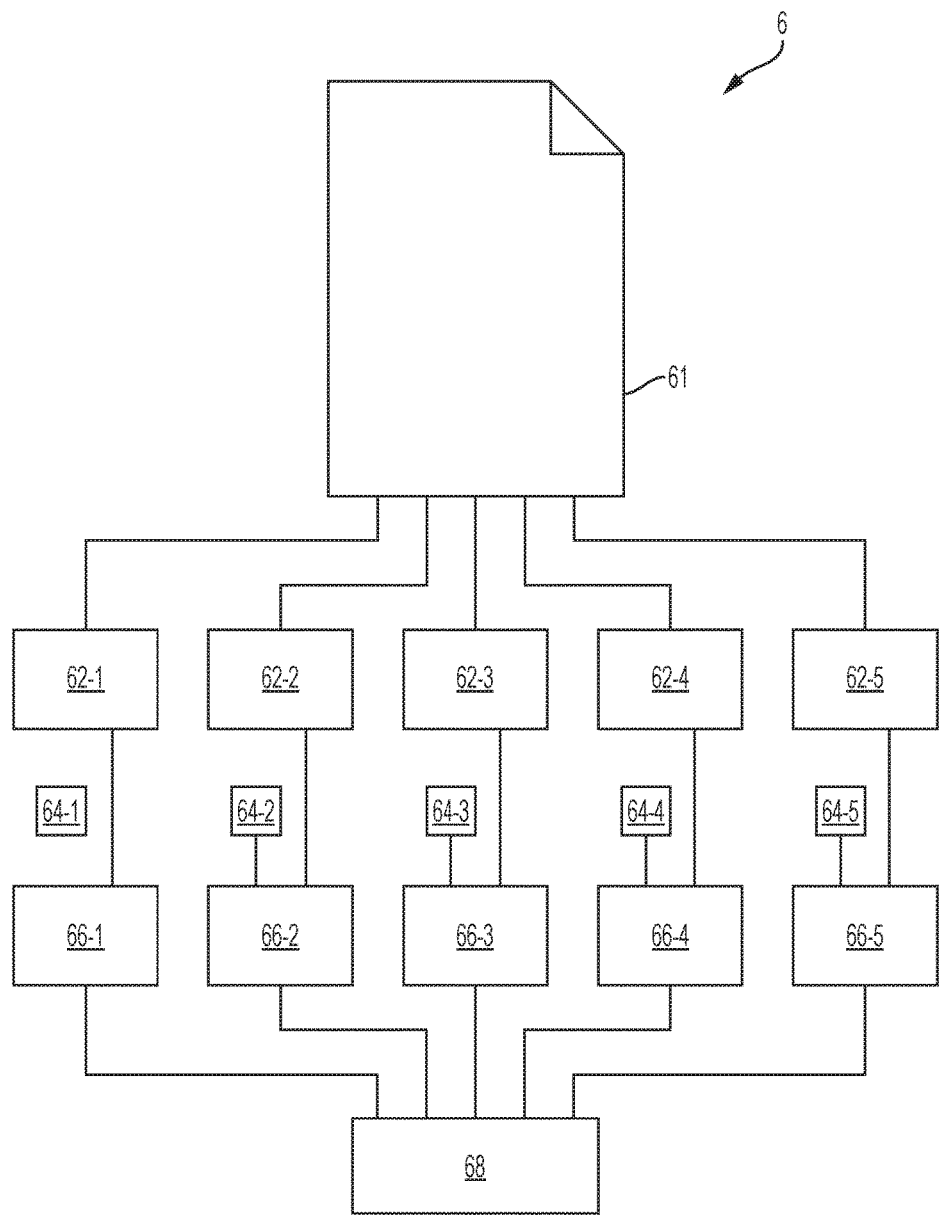
FIG. 7 shows a schematic diagram 6 of determining a content score of resource content in a network according to an embodiment of the present invention

FIG. 7 shows a schematic diagram 6 of determining a content score of resource content in a network according to an embodiment of the present invention.

From the resource content 61, a plurality of content score values 62-1, . . . 62-5 may be derived. The plurality of content score values 62-1, . . . 62-5 may comprise a relevance score value, a quality score value, a quantity score value, a language score value and an originality score value, for example. Each of the plurality of content score values 62-1, . . . 62-5 may be multiplied with a corresponding one of a plurality of content weight values 64-1, . . . 64-5 in order to provide a plurality of weighted content score values 66-1, . . . 66-5. The plurality of weighted content score values 66-1, . . . 66-5 may be summed in order to provide an overall content score value 68.

Figure 8:
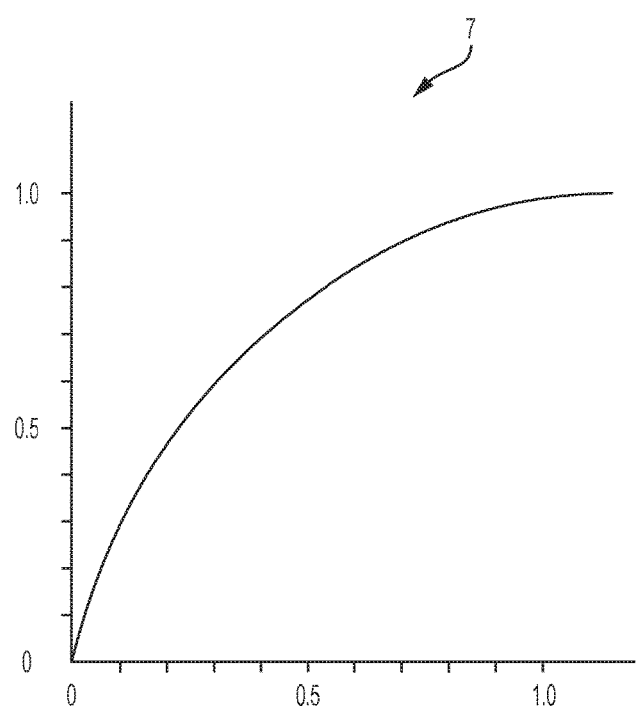
FIG. 8 shows a simplified exemplary function for processing a length ratio according to an embodiment of the present invention.

FIG. 8 shows a simplified exemplary function 7 for processing a length ratio according to an embodiment of the present invention.

The function 7 is a smooth strictly monotonically increasing function. The function returns, for example, for an input value x=0.0 an output value y=0.0, for an input value x=0.2 an output value y=0.5, for an input value x=0.5 an output value y=0.8 and for an input value x=1.0 an output value y=1.0. Thus, for input values 0<x<0.5, it is easier to achieve an output value, i.e. score, than for input values x>0.5, such that lower values of the length ratio are amplified and higher values of the length ratio are attenuated.

Figure 9:
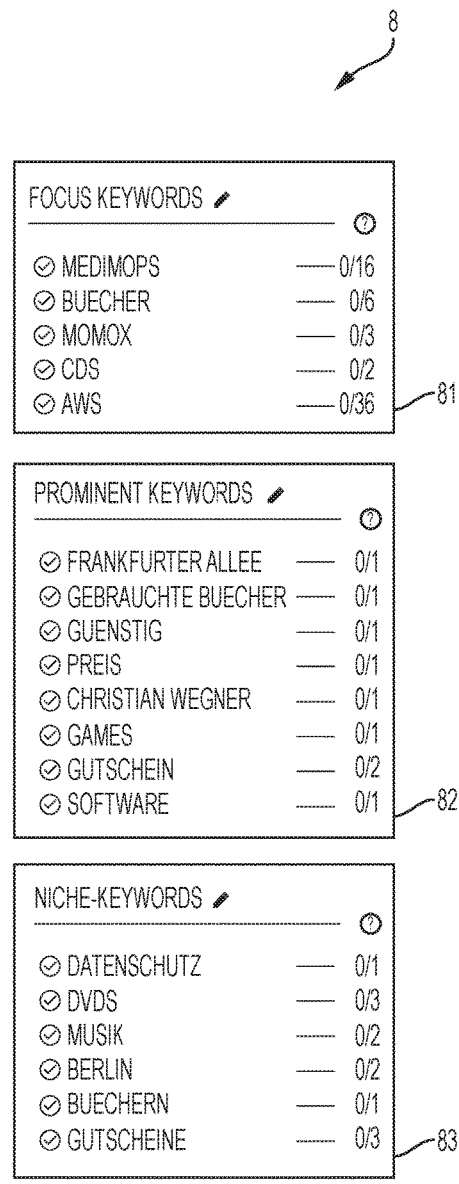
FIG. 9 shows a simplified exemplary screenshot 8 from a process for determining a content score of resource content in a network according to an embodiment of the present invention.

FIG. 9 shows a simplified exemplary screenshot 8 from a process for determining a content score of resource content in a network according to an embodiment of the present invention.

The screenshot 8 shows, for the keyword "aws", i.e. "Amazon Web Services", a plurality of essential terms 81, i.e. "Focus Keywords", with a corresponding plurality of essential-term target values, a plurality of relevant terms 82, i.e. "Prominent Keywords", with a corresponding plurality of relevant-term target values; and a plurality of additional terms 83, i.e. "Niche-Keywords", with a corresponding plurality of additional-term target values.

The embodiments described herein are exemplary and explanatory, and are not restrictive of the invention as defined in the claims.

The invention claimed is:

1. A computer-implemented method of determining a content score of one or more resource contents, the computer-implemented method comprising:
  a) receiving in a processor from a user the one or more resource contents and one or more main topics, wherein the one or more resource contents are contents of webpages which are completed or partially completed;
  b) automatically with the processor determining an overall content score value of the one or more resource contents in real-time while the user is creating or editing the one or more resource contents by:
    i) determining individual content score values which include a quantity score value and a language content score value,
    ii) determining weighted individual content score values by weighting the individual content score values, and
    iii) summing the weighted individual content score values;
  c) automatically with the processor determining instructions to improve the overall content score value;

d) outputting the overall content score value and presenting to the user in a form of a document or a webpage;
e) outputting the instructions as textual instructions, graphical instructions, or both;
f) editing the one or more resource contents by the user based on the instructions to increase the overall content score value of the one or more resource contents so that one or more webpages become more relevant according to the one or more main topics and will be ranked higher by one or more search engines;

wherein determining the quantity score value includes:
i) calculating a length ratio by dividing a length of the one or more resource contents by a target length value; and
ii) applying a function to the length ratio so that values of the length ratio which are greater than 0 and less than 0.5 are amplified and the values of the length ratio which are greater than 0.5 are attenuated, wherein the function is a smooth and strictly monotonically increasing function; and wherein the language content score value is determined by automatically determining a language of the one or more resource contents, and wherein the determining of the language content score value includes:
i) calculating two or more of the following: a weighted word distribution score value, a weighted unigram score value, a weighted bigram score value, and a weighted punctuation score value; and
ii) averaging or multiplying at least two of the following: the weighted word distribution score value, the weighted unigram score value, the weighted bigram score value, and the weighted punctuation score value.

2. The computer-implemented method of claim 1, wherein the method includes outputting the individual content score values and presenting to the user in the document or the webpage.

3. The computer-implemented method of claim 1, wherein the one or more resource contents include at least one of: a textual element, a structural element, a title element, a heading element, a table element, a media element, a graphical element, a video element, an interactive element, a link element, a map element, and an app element; and
wherein the one or more resource contents include at least one of a design, a layout, or an arrangement.

4. The computer-implemented method of claim 1, wherein the method includes automatically obtaining one or more relevant topics from a plurality of resources on a computer network; and
wherein the individual content score values include a relevance score value which is determined by using the one or more relevant topics.

5. The computer-implemented method of claim 4, wherein the computer network is a World-Wide Web.

6. The computer-implemented method of claim 4, wherein calculating the relevance score value includes:
i) automatically converting the one or more resource contents into one or more content vectors and the one or more relevant topics into one or more relevant topic vectors;
ii) determining one or more relevant-topic similarity values indicating similarity of the one or more relevant topic vectors to the one or more content vectors; and
iii) aggregating the one or more relevant-topic similarity values to calculate the relevance score value.

7. The computer-implemented method of claim 6, wherein Word2Vec converts the one or more resource contents into the one or more content vectors and the one or more relevant topics into the one or more relevant topic vectors.

8. The computer-implemented method of claim 1, wherein the individual content score values include a relevance score value and the method includes:
i) automatically converting the one or more resource contents into one or more content vectors and the one or more main topics into one or more main topic vectors;
ii) determining one or more main-topic similarity values indicating similarity of the one or more main topic vectors to the one or more content vectors; and
iii) aggregating the one or more main-topic similarity values to calculate the relevance score value.

9. The computer-implemented method of claim 8, wherein Word2Vec converts the one or more resource contents into the one or more content vectors and the one or more main topics into the one or more main topic vectors.

10. A computer-implemented method to determine a content score of one or more resource contents comprising:
a) receiving in a processor from a user the one or more resource contents and one or more main topics, wherein the one or more resource contents are contents of webpages which are completed or partially completed;
b) automatically with the processor determining an overall content score value of the one or more resource contents in real-time while the user is creating or editing the one or more resource contents by:
1) determining individual content score values which include a quantity score value, a relevance score value, and a language content score value,
2) determining weighted individual content score values by weighting the individual content score values, and
3) summing the weighted individual content score values;
c) automatically with the processor determining instructions to improve the overall content score value of the one or more resource contents;
d) outputting the overall content score value and presenting to the user in a form of a document or a webpage;
e) outputting the instructions as textual instructions, graphical instructions, or both; and
f) editing the one or more resource contents by the user based on the instructions to increase the overall content score value of the one or more resource contents so that one or more webpages become more relevant according to the one or more main topics and will be ranked higher by one or more search engines;

wherein determining the quantity score value includes:
i) calculating a length ratio by dividing a length of the one or more resource contents by a target length value; and
ii) applying a function to the length ratio so that values of the length ratio which are greater than 0 and less than 0.5 are amplified and the values of the length ratio which are greater than 0.5 are attenuated, wherein the function is a smooth and strictly monotonically increasing function; and wherein determining the relevance score value includes automatically obtaining one or more relevant topics from a plurality of resources on a computer network and using the one or more relevant topics to determine the relevance score value; or wherein determining the relevance score value includes:
i) automatically converting the one or more resource contents into one or more content vectors, and automatically converting the one or more main topics into one or more main topic vectors or the one or more relevant topics into one or more relevant topic vectors;
ii) determining one or more main topic similarity values indicating similarity of the one or more main topic vectors to the one or more content vectors, or determining one or more relevant topic similarity values indicating similarity of the one or more relevant topic vectors to the one or more content vectors;
iii) aggregating the one or more main topic similarity values or the one or more relevant topic similarity values to calculate the relevance score value; and wherein determining the language content score value includes:
i) automatically determining a language of the one or more resource contents;
ii) calculating two or more of the following: a weighted word distribution score value, a weighted unigram score value, a weighted bigram score value, and a weighted punctuation score value; and iii) averaging or multiplying at least two of the following: the weighted word distribution score value, the weighted unigram score value, the weighted bigram score value, and the weighted punctuation score value.

11. The computer-implemented method of claim 10, wherein the method includes outputting the individual content score values and presenting to the user in the document or the webpage.

12. The computer-implemented method of claim 10, wherein the one or more resource contents include at least one of: a textual element, a structural element, a title element, a heading element, a table element, a media element, a graphical element, a video element, an interactive element, a link element, a map element, and an app element; and
wherein the one or more resource contents include at least one of a design, a layout, or an arrangement.

13. The computer-implemented method of claim 10, wherein the computer network is a World-Wide Web.

14. The computer-implemented method of claim 10, wherein Word2Vec converts the one or more resource contents into the one or more content vectors and the one or more main topics into the one or more main topic vectors.

* * * * *